(No Model.)  2 Sheets—Sheet 1.

L. H. NASH.
OSCILLATING WATER METER.

No. 300,630. Patented June 17, 1884.

Attest:
Lotie Norris.
Nowell T. Bartle.

Inventor:
Lewis Hallock Nash
by Johnson & Johnson
Attys.

(No Model.)  
2 Sheets—Sheet 2.

L. H. NASH.
OSCILLATING WATER METER.

No. 300,630.  
Patented June 17, 1884.

Attest:  
Lutie Norris.  
Howell Bartte.

Inventor:  
Lewis Hallock Nash  
by Johnson and Johnson  
Attys

UNITED STATES PATENT OFFICE.

LEWIS HALLOCK NASH, OF BROOKLYN, ASSIGNOR TO THE NATIONAL METER COMPANY, OF NEW YORK, N. Y.

OSCILLATING WATER-METER.

SPECIFICATION forming part of Letters Patent No. 300,630, dated June 17, 1884.

Application filed February 27, 1884. (No model.)

*To all whom it may concern:*

Be it known that I, LEWIS HALLOCK NASH, a citizen of the United States, residing at Brooklyn, in the county of Kings and State of New York, have invented new and useful Improvements in Oscillating Water-Meters, of which the following is a specification.

In an application for a patent for improvements in water-meters, filed December 18, 1883, under Serial No. 114,916, I have described the object and scope of the invention to which my present improvement relates. The construction of the meter embraced in my said application involves means for controlling the eccentric movements of a piston open from end to end, combined with an abutment of the inclosing-case having an enlarged open end within the interior of the piston adapted to form a continuous joint upon the interior walls thereof at every point of its motion, whereby its eccentric movements are effected by the co-operating action of an interior pressure within the piston, and an exterior pressure within the case on the outside of the piston. In this construction the controlling bearing of the piston is supported in the center of the inclosing-case and the piston swings or moves upon a radial arm passing through a dividing-opening in the enlarged end of the radial abutment, and adapted to co-operate with the center bearing of the inclosing-case to divide the interior of the piston into receiving and discharging spaces. Such invention, broadly considered, is shown herein, and I do not, therefore, claim broadly herein means for controlling the path of an eccentrically-moving piston, open from end to end, nor any combination of devices or matter in my said application.

The improvement claimed herein consists in matters of construction and of combination, whereby the radial arm upon which the piston swings is adapted to form a contact with an abutment having a non-divided enlarged end, the latter being provided with a horizontal oblong opening, equal in width to the vertical thickness of the arm, through which it extends, and makes a joint bearing on three of its sides with the walls of the said oblong opening.

Figure 1:
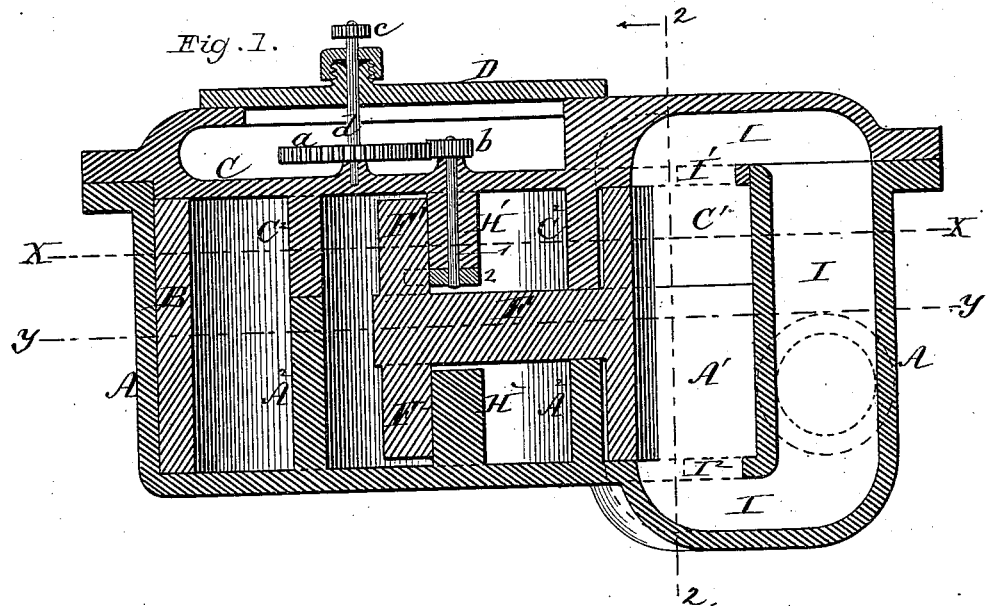
Figure 2:
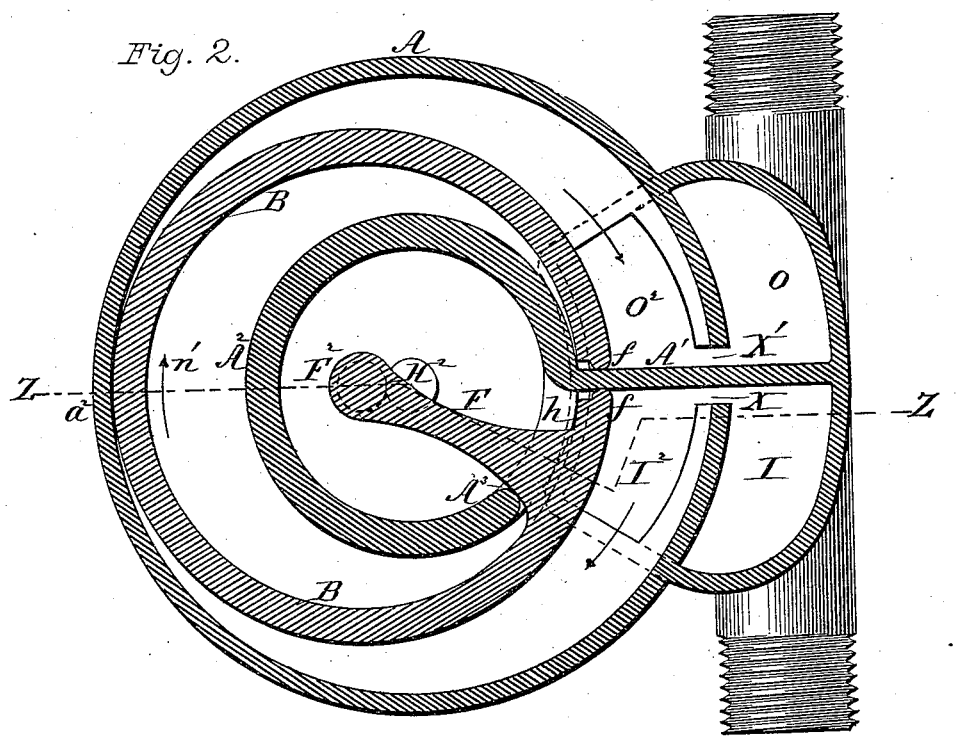
Figure 3:
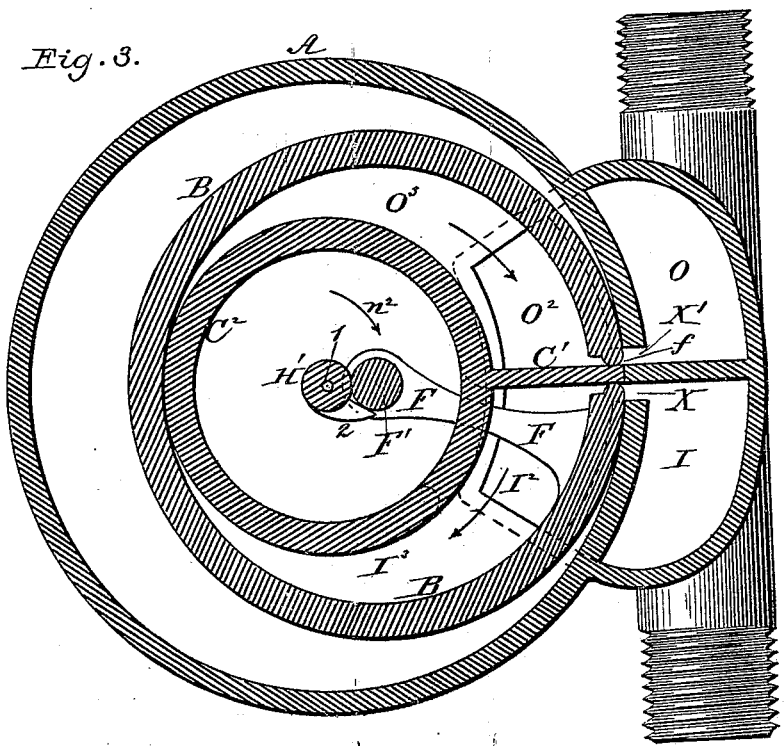
Figure 4:
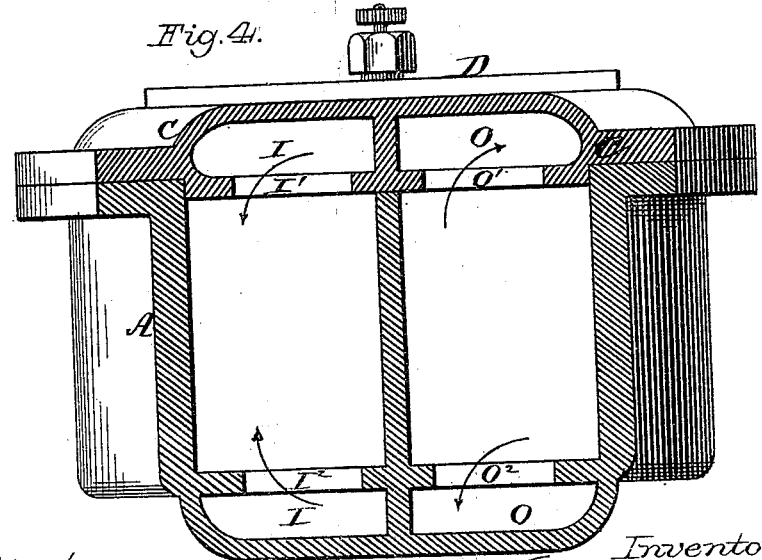

Referring to the accompanying drawings, Figure 1 represents a vertical section through the meter, on the line Z Z of Fig. 2; Fig. 2, a horizontal section of the same on the line $y\ y$ of Fig. 1; Fig. 3, a similar section on the line X X of Fig. 1, the piston being shown in a different position; and Fig. 4, a vertical section on the line 2 2 of Fig. 1.

The cylinder or case A has at one side an extension-chamber, forming the inlet-passage I and outlet-passage O, which connect by branch passages with the inlet-ports I' I² and outlet-ports O' O² in the cylinder-heads. The case has a radial abutment extending from head to head of the cylinder, and divides the chamber of the case into receiving and discharging spaces. The abutment terminates at its inner end in a ring enlargement concentric with the case, having a horizontal oblong opening $h$ at its side next the inlet and discharge ports. The abutment is preferably formed of a lower part, A' A², and an upper part, C' C², cast with their respective case-heads, and from the center of these heads project inwardly fixed studs H' H², as shown in Fig. 1. The piston B is an open ring, and has an eccentric movement about the center of the case, guided by a slot, $f$, formed longitudinally in its side upon the radial part of the abutment, and in such movement forms a continuous contact with its interior wall upon the ring-abutment in every position of the piston within the inclosing-case. The piston has a radial arm, F, which extends through the oblong slot $h$ into the ring-abutment, and carries two centrally-placed studs, F' F², which revolve around and in contact with the case-studs.

In one of the case-studs, H', is arranged a shaft, 1, having a crank-arm on its lower end, adapted to bear upon the piston-stud F' and be revolved by it, while the shaft passes through the upper head and carries a pinion, $b$, which meshes with a gear-wheel, $a$, on a shaft, $d$, stepped in the upper head and passing through a stuffing-box in a cover, D, and carries a gear-wheel, $c$, which meshes with and operates the registering mechanism, which is not shown. The interior and exterior surfaces of the piston are of such form as to maintain a joint-forming contact upon the inner wall of the case and upon the outer wall of the abutment at all positions in the movement of the piston. The slot $h$ of the ring-abutment is of a length sufficient to allow of the movement of the piston-arm therein to accommodate the piston's movement. The slot is formed at the inlet side of the abutment and makes a joint bearing by its curved end $A^3$ with the side of the piston-arm, while the top and bottom of the latter form joints with the top and bottom of said slot, thus insuring an easy and steady movement of the piston. The inlet and outlet ports open into the case-chamber, and their capacity is increased by forming the openings $X X'$ in the side of the case on each side of the abutment communicating with the chamber of the case and with the inlet and the outlet passages.

In the operation of the piston, when in the position shown in Fig. 2, the water enters the inlet-passage I X and passes through the ports $I' I^2$ into the case-chamber on one side of the abutment, and, pressing against the piston, forces it in the direction of the arrow $n'$, the water meanwhile discharging from the opposite side of the piston through the outlet-ports $O' O^2$ into the passage $X' O$. In this movement of the piston the incoming water presses upon its external surface from the abutment to the opposite point $a^2$ of the case. The continued movement of the piston to the position shown in Fig. 3 will bring its chamber in communication with the inlet-ports $I' I^2$, and the water will then enter the piston-chamber, and, pressing against its inner wall from the radial abutment to the opposite point of its ring enlargement, aid in moving the piston in the same direction, the water meanwhile discharging from the piston-chamber through the outlet-ports. In this position of the piston its chamber is divided into a receiving-space, $I^3$, and a discharging-space, $O^3$, and the interior pressure acts in connection with the exterior pressure to move the piston in the direction of the arrow $n^2$. This interior pressure continues throughout the return movement of the piston, aided by the exterior pressure of the inflowing water, it being understood that the joint of contact of the piston with the inner wall of the case, and with the outer wall of the ring-abutment is continually changing in such manner that the combined internal and external pressures always act upon the piston in the direction of its motion. This movement of the piston causes its center studs to travel round the fixed case-studs, thus revolving the crank-arm 2 and operating the registering mechanism, the movement of the piston upon and over the radial part of the abutment being controlled by the co-operating action of said studs and abutment.

I have described the meter as having two inlet and two outlet ports; but it will operate as well with one inlet and one outlet port, which may be either at the top or at the bottom of the case.

I have described the piston as being guided in its movements by the contact of the studs and the operation thereby of the crank-arm to operate the registering device; but it is obvious that the movement of the piston might be communicated to the registering device by a direct crank-connection with the gear-shaft 1 without the piston-studs, in which case the joint contact of the piston with the case will be maintained in the same manner, and the registration effected in the same manner.

By dispensing with the registering mechanism and applying power to the piston by means of a crank, the machine may be used as a pump, or by suitable connections the machine can be used as a motor.

I claim—

1. The combination of an eccentrically-moving piston open from end to end, having a longitudinal slot at its side, and an inward-extending radial arm, F, with the radial abutment terminating in a cylinder within the piston, having a horizontal oblong slot in its side, adapted to receive and form a joint with the piston-arm, substantially as described, for the purpose specified.

2. The radial abutment having at its inner end a non-divided ring enlargement, provided with a horizontal oblong slot, $h$, having the joint contact end $A^3$, and the piston having the arm F, adapted to form a joint with three sides, of the oblong abutment slot in the movements of said piston, combined with an inclosing-case having suitable inlet and outlet ports and passages, and suitable means for transmitting the motion of the piston, substantially as described.

3. The combination, in a water-meter, of an open-ring piston having the radial arm F, with an inclosing-case having a radial abutment terminating in a central ring-abutment adapted to make a joint bearing with said radial arm, as herein set forth.

In testimony whereof I have hereunto set my hand in the presence of two subscribing witnesses.

LEWIS HALLOCK NASH.

Witnesses:
H. W. BRINCKERHOFF,
CHRISTOPHER C. WHITTEMORE.